United States Patent [19]

Daniels

[11] Patent Number: 4,802,606
[45] Date of Patent: Feb. 7, 1989

[54] NEWSPAPER DISPENSER

[76] Inventor: Duane D. Daniels, P.O. Box 67, Ainsworth, Nebr. 69210

[21] Appl. No.: 119,820

[22] Filed: Nov. 12, 1987

[51] Int. Cl.⁴ .................. B65G 59/02; G07F 11/22
[52] U.S. Cl. ........................................ 221/39; 221/40;
 221/103; 221/195; 221/230; 221/259; 221/262
[58] Field of Search .................... 221/40, 39, 194–195,
 221/230, 262, 224, 259, 14, 103, 110, 155

[56]  References Cited
 U.S. PATENT DOCUMENTS

| | | | |
|---|---|---|---|
| 1,028,091 | 5/1912 | Matthews | 221/39 |
| 1,160,449 | 11/1915 | Rossmanith | 221/40 |
| 1,167,214 | 1/1916 | Petersen | 221/39 X |
| 1,677,939 | 7/1928 | Vinogradov | |
| 2,612,426 | 9/1952 | Hawks | 312/55 |
| 2,822,953 | 2/1958 | Kunath | 221/93 |
| 2,858,047 | 10/1958 | Williams et al. | 221/213 |
| 2,876,884 | 3/1959 | Ray | 194/10 |
| 3,168,212 | 2/1965 | Edwards | 221/39 |
| 3,225,961 | 12/1965 | Parks | 221/20 |
| 3,536,231 | 10/1970 | Knickerbocker | 221/155 |
| 3,685,691 | 8/1972 | Charest | 221/225 |
| 3,708,087 | 1/1973 | Schonthal | 221/155 X |
| 4,131,213 | 12/1978 | Tamura et al. | 221/155 X |
| 4,496,074 | 1/1985 | Owens | 221/40 X |

Primary Examiner—Charles A. Marmor
Attorney, Agent, or Firm—Zarley, McKee, Thomte, Voorhees & Sease

[57]  ABSTRACT

A newspaper dispenser includes a housing with an upwardly biased platform therein for supporting a stack of newspapers. A scoop assembly which dispenses a single newspaper at a time, is mounted in the housing and includes a pusher arm and a scoop connected to reciprocating rotatable drive shaft. Rotation of the shaft in one direction causes the pusher arm to drop onto the top newpaper and push the top layer rearwardly, while simultaneously dropping a scoop in front of the folded edge of the newspaper. Rotation of the shaft in the opposite direction causes the scoop to slide under the paper, causes the pusher arm to pull the paper onto the scoop, and causes the pusher arm to raise off of the paper as the scoop tilts to drop the paper down a chute for dispensing. A rotatable handle is connected to the scoop assembly via a series of gears and rack and drive gear to operate the reciprocating cycle to dispense a paper.

12 Claims, 10 Drawing Sheets

NEWSPAPER DISPENSER

TECHNICAL FIELD

This invention relates generally to a newspaper dispensing machine, and more specifically to coin-operated newspaper dispensers which vend a single paper at a time.

BACKGROUND OF THE INVENTION

Newspaper vending machines have been known for many years, and come in a huge variety of shapes and sizes. However, there are few, if any, known single-vend type dispensers which are used on the market today. This is not because single-vend newspaper dispensers are unknown, but rather, because the known dispensers simply do not work to the degree necessary to make them economically viable in the marketplace.

The single-vend newspaper dispenser was originally designed to make available only a single copy of a newspaper upon the insertion of the proper currency. However, the main problem with prior art single-vend dispensers was their unreliability.

One of the main reasons prior art devices were unreliable is in the fact that newspapers are not all of the same thickness. Thus, a machine capable of dispensing a typical weekday paper would require adjustment to properly vend a weekend or special issue.

Another problem with prior art single-vend dispensers was in their high potential for ripping or otherwise damaging the paper during the dispensing operation. The customer that receives a damaged paper would not likely return to use such a dispenser again.

Another problem in the prior art was in the small number of papers the machine was capable of holding. Those machines that require bulky and complicated machinery to dispense the paper could hold only a few papers. The higher cost of such machines would pay for themselves in a longer amount of time, thereby reducing the economic viability of the devices.

It was also a problem to observe whether the machine was empty or what edition of the paper was to be found inside.

Another problem with prior art machines was in the storage of coins in the machine, and the method for removing them. It was typically necessary for the person removing the coins to open the machine so as to gain access to the storage box. Such a requirement is not only time consuming, but can affect the adjustment of the dispensing mechanism.

It is therefore a general object of the present invention to provide an improved newspaper dispenser which will vend a single paper at a time.

Another object of the present invention is to provide a single-vend paper dispenser which will reliably dispense a variety of thicknesses of papers without adjustment.

A further object is to provide a single-vend dispenser which will not damage the paper during the dispensing operation.

Yet another object of the present invention is to provide a single-vend newspaper dispenser which will hold a large amount of papers so as to be competitive with non-single-vend machines.

Still a further object is to provide a newspaper dispenser which clearly indicates what paper is in the machine and when the machine is empty.

Another object of the present invention is to provide a single-vend newspaper dispenser with a coin storage unit that may be accessed without opening the machine.

These and other objects will be apparent to those skilled in the art.

SUMMARY OF THE INVENTION

The newspaper dispensing machine of this invention includes a housing with a top portion which may be pivoted upwardly to allow access to the interior of the housing. Newspapers are stacked on an upwardly biased platform, and will be dispensed a single copy at a time by a scoop assembly fastened in the pivotable top portion of the housing. The scoop assembly includes a main drive shaft which rotates in one direction and then reciprocates to rotate in the other. A pusher arm connected to the drive shaft drops onto the top paper, pushes rearwardly so as to pull the folded edge from under a stop and raise the folded edge slightly, as the shaft rotates in one direction. Simultaneously, a scoop connected to the shaft is dropped onto the paper and drawn back past the folded edge. As the shaft rotates in the opposite direction the scoop is pushed under the paper and the pusher arm pulls back to pull the paper onto the scoop. Finally, further rotation of the shaft lifts the pusher arm off of the paper, while tipping the scoop rearwardly to cause the paper to slide over the rearward edge of the scoop and down a chute to a dispenser spout.

A power assembly connects rotatable handle to the rotatable reciprocating shaft to operate the scoop assembly and dispense a paper. The power assembly includes a series of gears and a rack and drive gear which are arranged to convert the rotation of the handle into the reciprocating rotation used to power the shaft.

A coin-operated lock assembly serves to prevent rotation of the handle, and thereby prevent the dispensing of a paper, until the proper amount of currency is inserted. In general, the lock assembly is pivotally connected to the housing such that the entire assembly will pivot about one point when the proper currency is inserted in the coin mechanism. This pivoting of the entire assembly allows the handle to rotate. If the coin mechanism does not receive the proper currency, only a small portion of the lock assembly will pivot, and the small portion will pivot in a different manner, such that the handle is restrained from rotating.

The newspaper vendor of this invention also includes a transparent portion in the front wall with a display paper in a pocket located behind the transparent wall. A release assembly connected between the platform holding the newspaper stack, the scoop assembly and a pivotable bottom plate in the pocket, will sense when there are no papers remaining on the platform, and will dispense the display paper upon operation of the scoop assembly.

BRIEF DESCRIPTION OF THE DRAWINGS

FIG. 16 is a side sectional view of the invention.

DESCRIPTION OF THE PREFERRED EMBODIMENT

Referring now to the drawings, in which similar or corresponding parts are identified by the same reference numeral, the newspaper dispenser of this invention is designated generally at 10, and includes a scoop assembly 20, a power assembly 90, a coin-operated lock assembly 130, and a display-paper release assembly 210.

Figure 1:
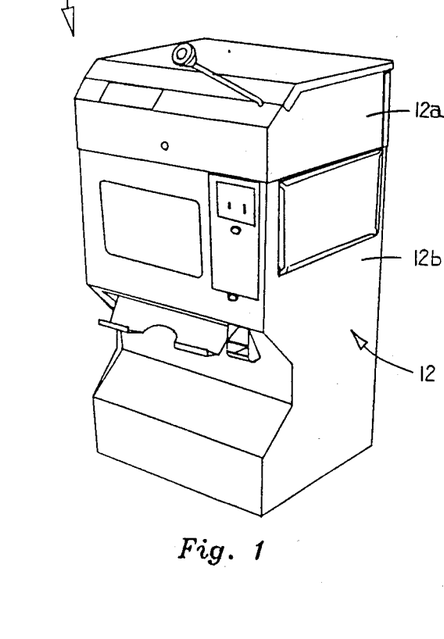
FIG. 1 is a perspective view of the invention.
Figure 2:
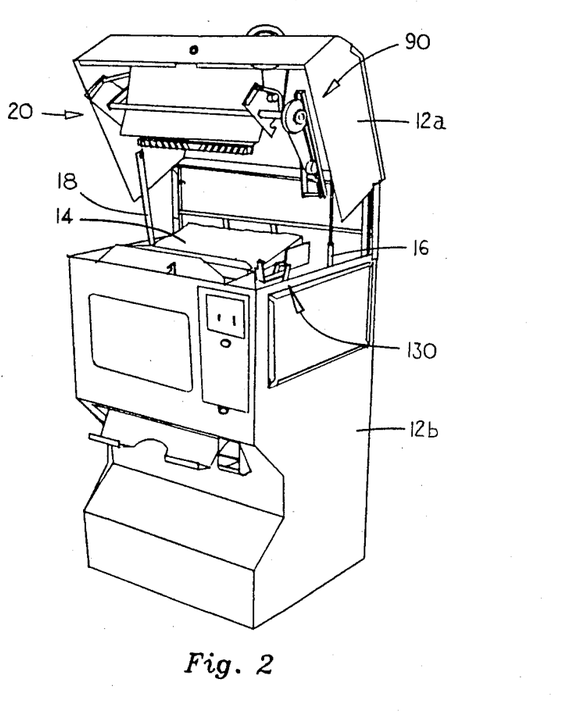
FIG. 2 is a perspective view of the invention with the top raised for loading papers.

Generally, the newspaper vender 10 includes a box-type frame 12 which holds the above-described assemblies. As shown in FIG. 2, frame 12 includes an upper, pivoting top portion 12a and a lower, base portion 12b. A stack of newspapers 14 are loaded into base portion 12b by opening upper portion 12a as shown in the drawings. A pneumatic cylinder 16 is connected between upper and lower frames 12a and 12b to assist in opening the machine. A locking bar 18 serves to hold upper portion 12a during loading of newspapers 14 in base 12b.

Figure 3:
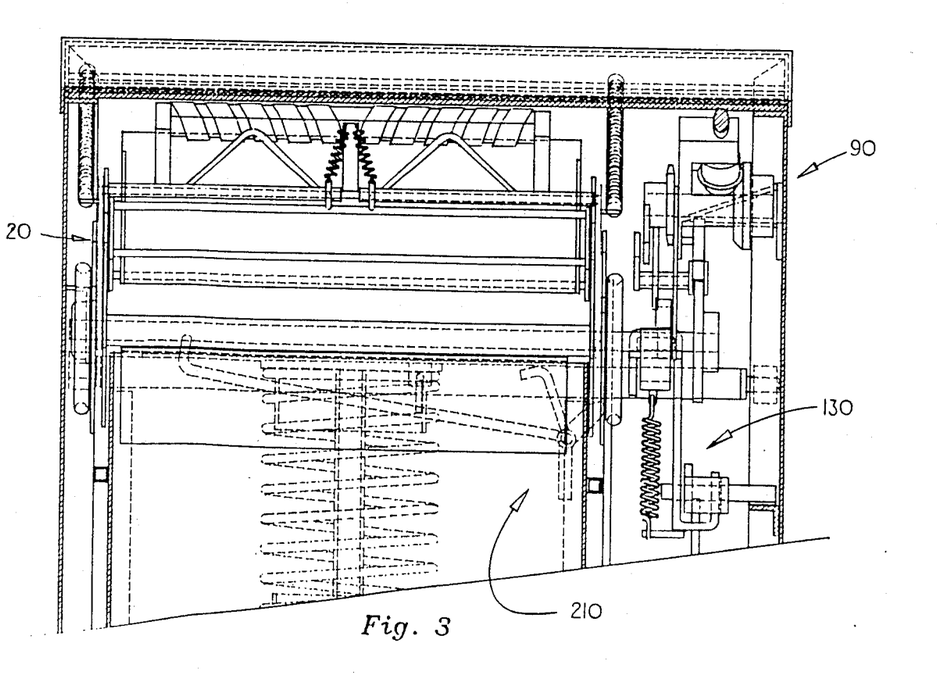
FIG. 3 is a front sectional view of the invention.
Figure 4:
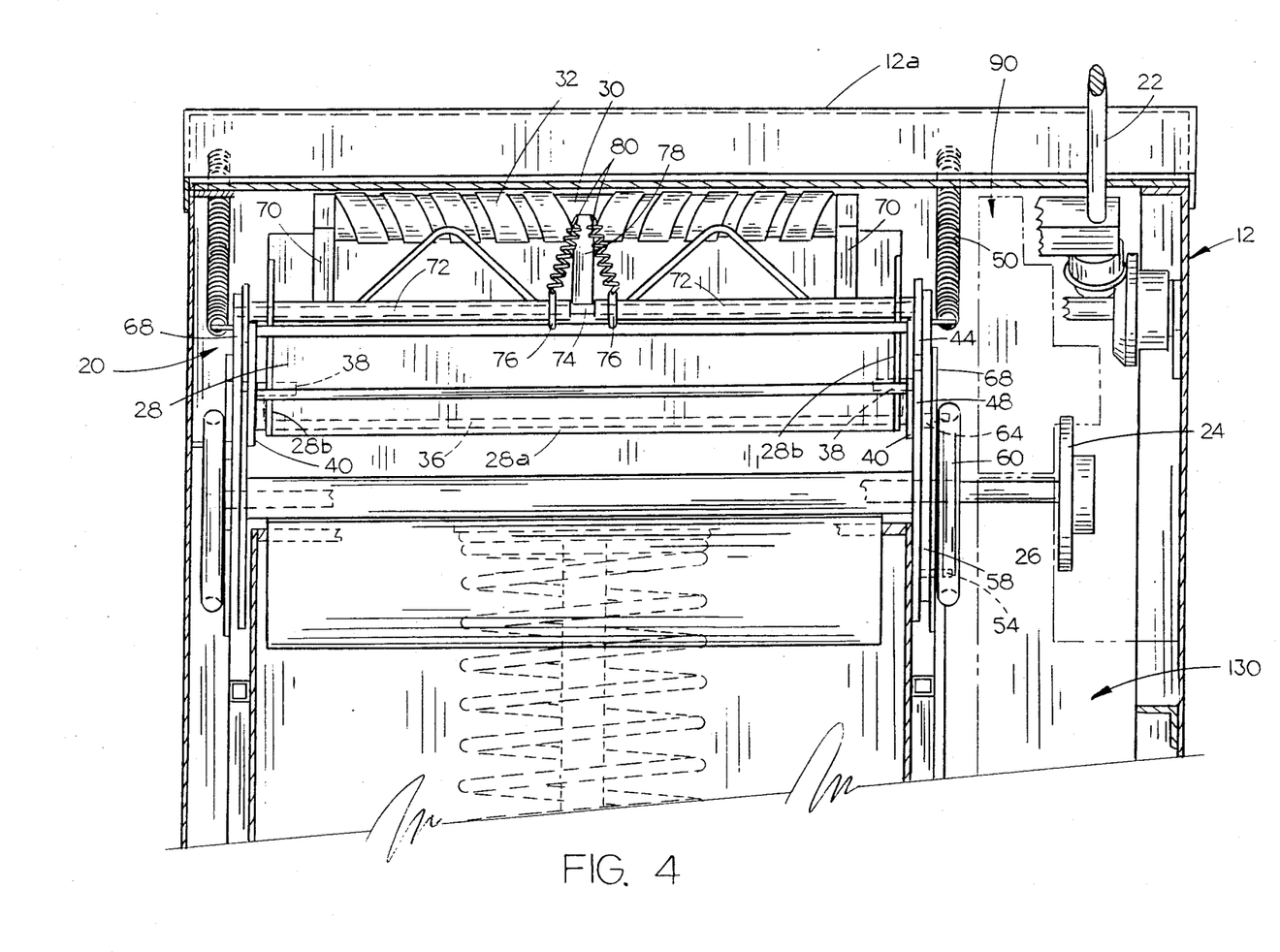
FIG. 4 is an enlarged front sectional view of the invention with portions removed for clarity.

FIG. 3 is a front sectional view of the newspaper vender 10, showing all of the above assemblies therein, and there general relationship. For ease and clarity of description, only the scoop assembly 20 and related frame and elements are shown in FIGS. 4-10, wherein the operation of the scoop assembly 20 is shown as it dispenses a single newspaper. Handle 22 is merely shown to indicate the position thereof during the operation of scoop assembly 20. As will be discussed in more detail below, handle 22 is cranked by the purchaser, the power being converted so as to rotate a main drive gear 24 first in one direction, and then back in the opposite direction. This reciprocating action is transmitted along a shaft 26 to operate scoop assembly 20. A portion of power assembly 90 and lock assembly 130, have been omitted from FIG. 4, are are generally indicated by the boxed broken line areas.

Figure 5:
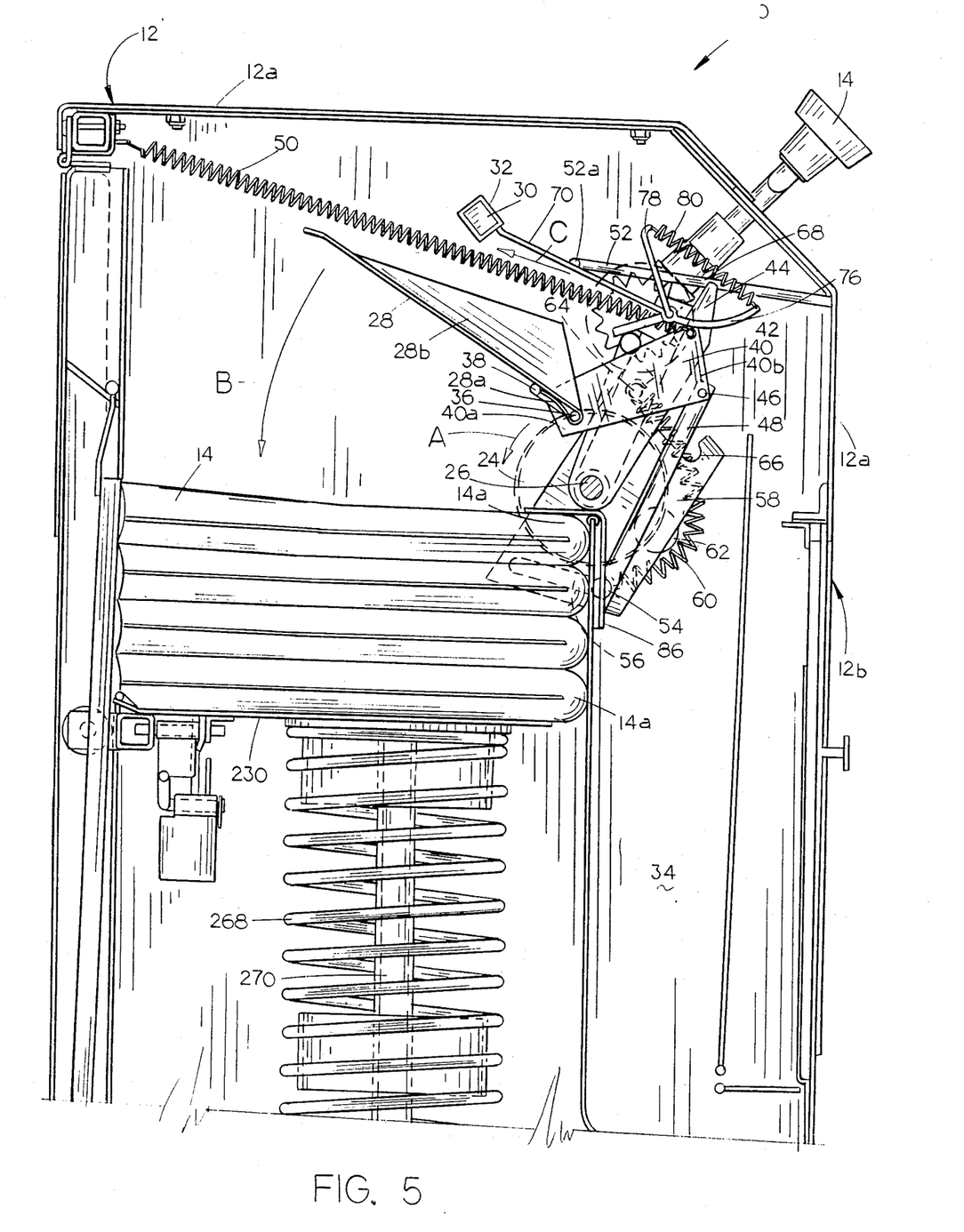
FIGS. 5-10 are side sectional views of the scoop assembly showing the invention in different positions of operation.
Figure 6:
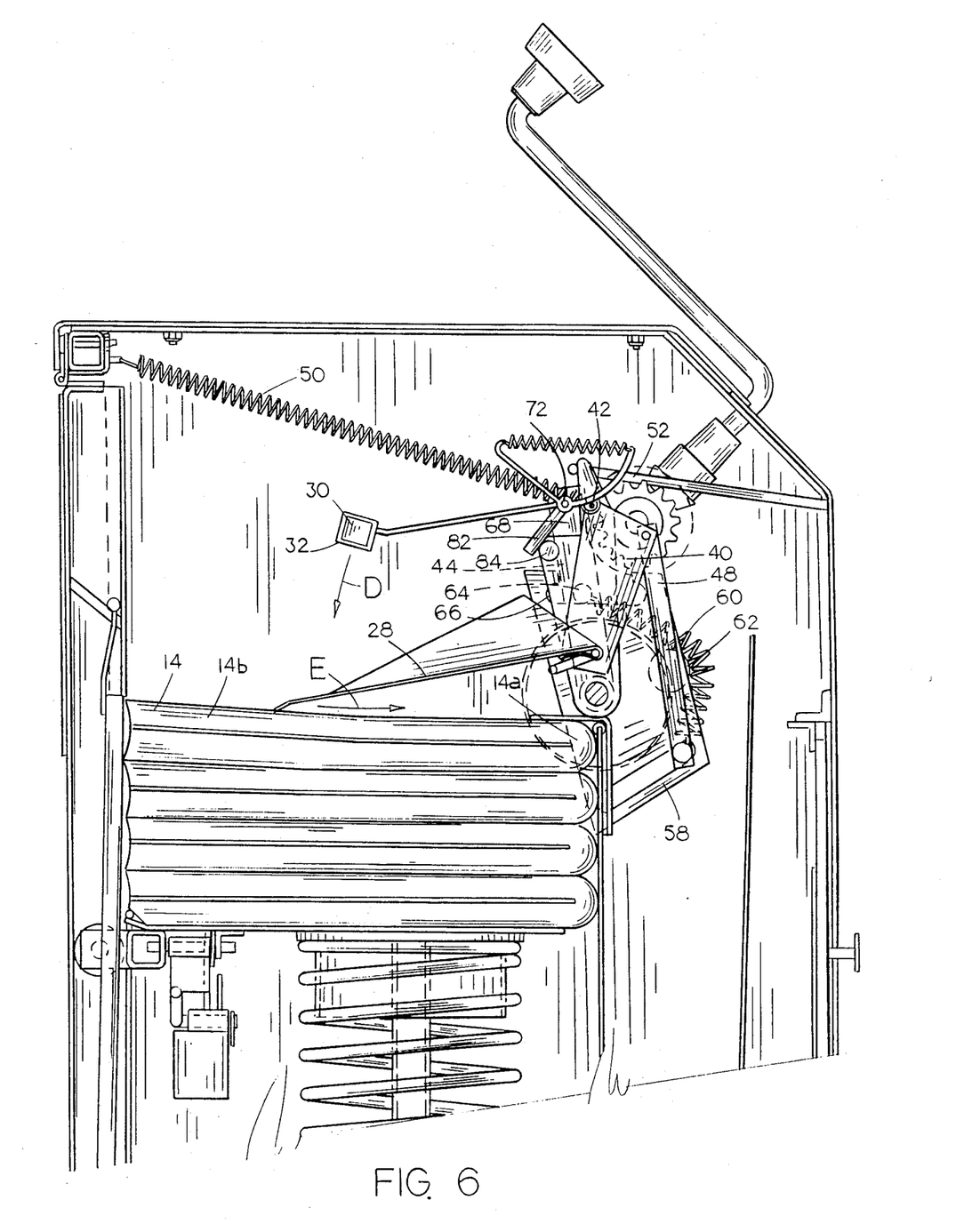
Figure 7:
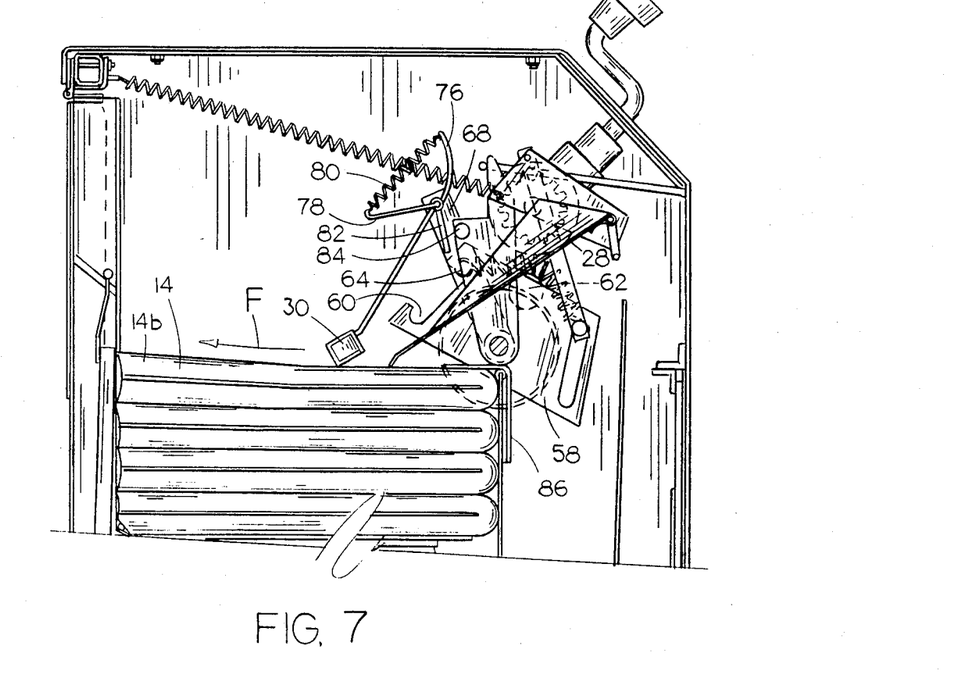
Figure 8:
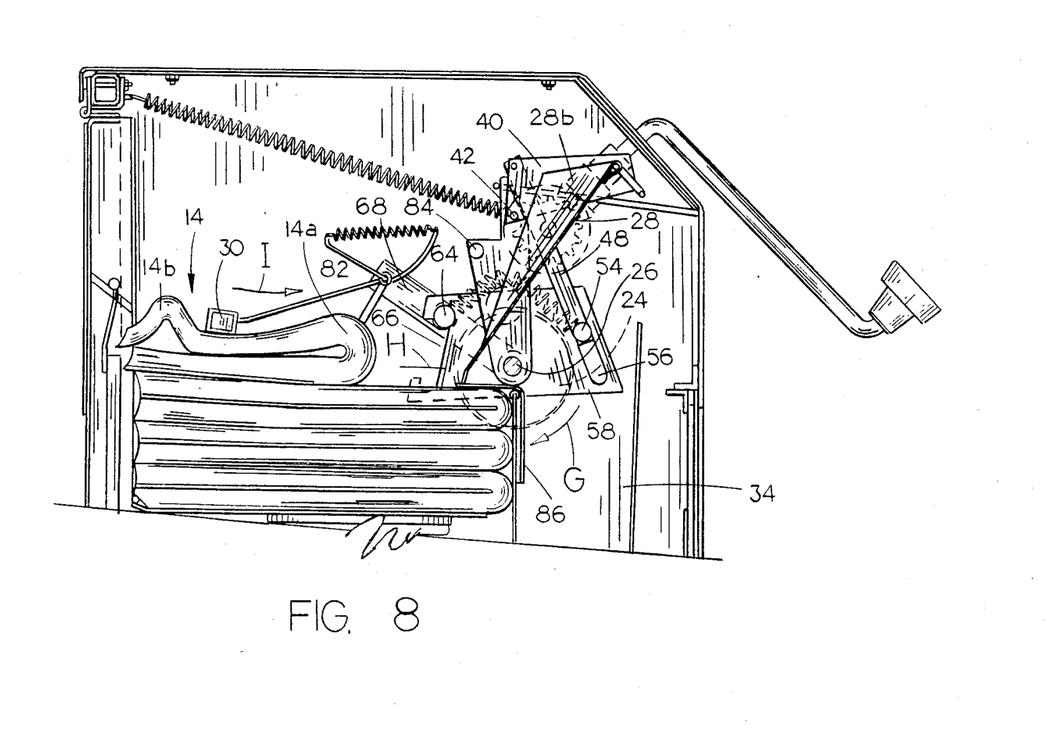
Figure 9:
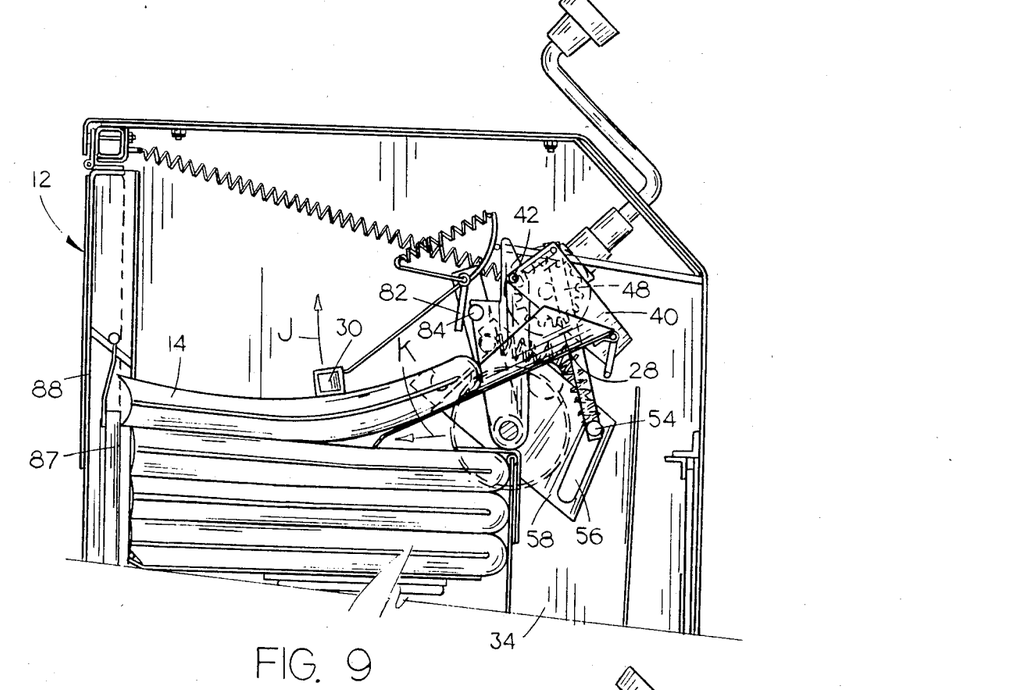
Figure 10:
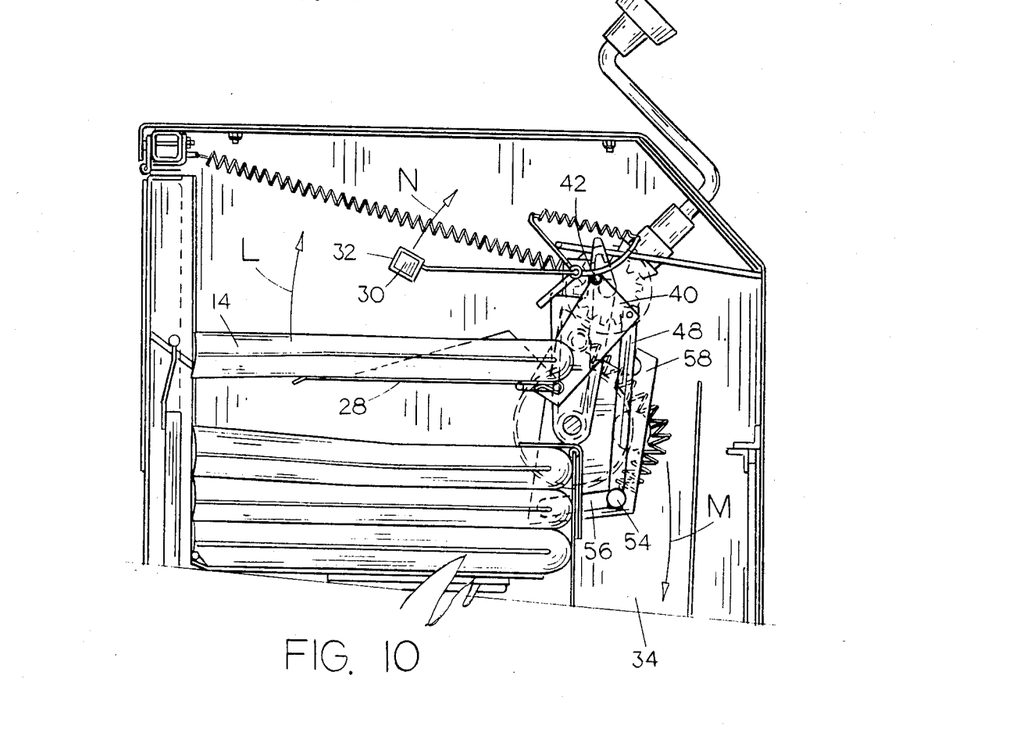

In general, a scoop 28 is lowered with its front edge resting on the top of a stack of newspapers 14 (FIGS. 5-6). A push bar 30, having a rubber strap 32 wound therearound for frictional contact with the paper 14, is dropped down onto the top of newspapers 14 (FIG. 7). Scoop 28 then slides back towards the folded edge 14a of the newspaper 14, while push bar 30 pushes the upper layer 14b of the paper 14 in the opposite direction (FIGS. 7-8). While upper layer 14b is pulled back, scoop 28 slides under the folded end 14a and push bar 30 pulls L the upper layer 14b back, to lay the paper on top of scoop 28 (FIGS. 8-9). Scoop continues to slide under paper 14 and then lifts it upward, as push bar 30 raises upward out of the way (FIGS. 9-10). Scoop 28 then tips back to the initial position of the next cycle (FIG. 5), thereby allowing the paper 14 to slide down into paper chute 34 to be retrieved by the purchaser.

Scoop 28 has a generally rectangular shape and is pivotally mounted along a rearward longitudinal edge 28a to a rod 36, and has a pair of upwardly projecting side walls 28b for guiding a newspaper. Rod 36 has U-shaped ends 38 and is rigidly fixed between a pair of plates 40 to move therewith. Scoop 28 is pivotally mounted on rod 36 and rests atop U-shaped ends 38 such that it may pivot upward away from ends 38 (as shown in FIGS. 6-9) and also be raised up and tipped while resting on ends 38 (as shown in FIGS. 4, 5 and 10).

It is noted that scoop assembly 20 utilizes matching operating structure at each end of scoop 28, and for clarity only one set will be described herein, with the understanding that an identical set operates simultaneously at the opposite side of scoop 28.

Plate 40 is generally rectangular and has end 38 of rod 36 affixed near one end 40a thereof and perpendicular thereto. Plate 40 is pivotally mounted at the other end 40b at one corner 42 to a base arm 44, and at the other corner 46 to a scoop drive arm 48. Base arm 44 is rotatably mounted at its lower end to main shaft 26 and is connected, via a long spring 50 at its upper end, to top portion 12a of frame 12. Spring 50 will bias the upper end of base arm 44 against the bent end 52a of a projecting rod 52, as shown in FIGS. 6-9. When base arm 44 is biased against rod 52, it can be seen that plate 40 pivots about its pivotal connection 42 to base arm 44, thereby pulling and pushing scoop 28.

Scoop drive arm 48 is pivotally connected at its upper end to plate 40 and has a projecting peg 54 at its lower end which projects through a slot 56 in a main drive plate 58. Main drive plate 58 is affixed to main drive shaft 26 and will reciprocate therewith from a position tipped back from the vertical (FIG. 5), through the vertical (FIG. 6), to a generally horizontal position (FIG. 8), and back again (FIGS. 9, 10 and 5). As shown in FIGS. 8-10, peg 54 within slot 56 will pull arm 48 downwardly as main drive plate 58 rotates from the horizontal back through the vertical position. This in turn pivots plate 40 about pivot point 42 to push scoop 28 under a paper 14 and to raise scoop 28 to dispense the paper down chute 34.

Drive arm 48 is forced upwardly, to pivot plate 40 and pulls scoop 28 rearwardly, by a spring 60 attached to peg 54, wrapped around a roller 62 and connected to a pin 64. Pin 64 is slidable in a second slot 66 in the opposite end of main drive plate 58. Pin 64 projects from near the midpoint of a push bar drive member 68 (best seen in FIG. 8) which is pivotally connected to main drive shaft 26 between base arm 44 and main drive plate 58. Drive member 68 abuts against pivot point 42 of base arm 44 and will thereby be pivoted along with base arm 44 as shown in FIGS. 5-6, by spring 50. This pulls drive arm 48 upwardly and drops scoop 28 down onto newspapers 14. As main drive plate 58 continues to rotate, pin 64 slides within slot 66, the bias of spring 60 continuing to pull peg 54 and drive arm 48 upwardly. Once pin 64 reaches the end of slot 66 in main drive plate 58, drive plate 58 will continue to pivot pin 64, thereby pushing drive arm 48 upwardly until main drive plate 58 has reached the extent of its rotation (shown in FIG. 8). Peg 54 in slot 56 then pulls downwardly on arm 48 as described above to complete the reverse cycle.

The final portion of the scoop assembly is the push bar 30. Push bar 30 has a pair of arms 70 (see FIGS. 4 and 5) extending from a pair of sleeves 72 rotatably mounted on a rod 74 which is affixed between drive members 68. Sleeves 72 are independently rotatably mounted on the rod 74 to allow the ends of push bar 30 to rise and fall independently to more easily conform to the irregular shape of a stack of papers 14. The adjacent ends of sleeves 72 each have a rearwardly projecting arm 76 which are connected to a center post 78 projecting from rod 74 via springs 80. Springs 80 and arms 76 assist in biasing push bar 30 downwardly to conform to the paper 14.

A lift arm 82 (see FIG. 6) is affixed to each sleeve 72 adjacent push bar drive member 68, and will abut against a peg 84 projecting from base arm 44 so as to lift push bar 30 upwardly off of the papers 14.

In operation, drive gear 24 and main drive shaft 26 will rotate from an initiating position shown in FIG. 5, in a direction shown by arrow A. Main drive plate 58 will rotate along with shaft 26, thereby dropping scoop 28 downwardly to the stack of papers 14 by pivoting plate 40, as shown by arrow B. Simultaneously, push bar drive member 68 will pivot forwardly with base arm 44 (arrow C) as drive plate 58 allows spring 50 to bias base arm 44. Once main drive plate 58 has rotated such that pin 64 has reached the end of slot 66, further rotation will pull push bar drive member 68 outwardly, dropping push bar 30 down to the paper 14 (arrow D, FIG. 6) as lift arm 82 is pulled away from peg 84 on base arm 44 (see FIGS. 6-7). This will also pivot plate 40 about point 42, thereby pulling scoop 28 rearwardly toward fold 14a of paper 14 (arrow E, FIG. 6).

As shown in FIG. 7, continued rotation of drive plate 58 will pivot push bar drive member 68 about shaft 26 and thereby force push bar 30 downwardly and outwardly as shown by arrow F. The rubber strap 32 on push bar 30 then frictionally pushes upper layer 14b of the paper rearwardly, and pulls the paper 14 out from under pivotable angle plate 86. At FIG. 8, main drive plate 58 has reached the extent of its rotation and reciprocates back in the opposite direction for the remainder of the operation.

Drive gear 24 and drive shaft 26 reverse their rotation (arrow G) causing scoop 28 to slide forwardly (arrow H) under paper 14, and pulling push bar 30 rearwardly (arrow I) to lay the folded edge 14a of paper 14 onto scoop 28. Further rotation of drive plate 58 in the reverse direction will cause lift arm 82 to contact peg 84, thereby lifting push bar 30 upwardly (arrow J, FIG. 9) off of paper 14. Simultaneously, plate 40 will push scoop 28 under paper 14 (arrow K), the paper being held in position by a pair of vertically-oriented positioning bars 87 connected to the back wall 88 of frame 12.

Finally, main drive plate 58 will reach the extent of its reverse rotation (as shown in FIG. 5) and will tip scoop 28 upwardly (arrow L in FIG. 10) and allow paper 14 to slide off the rearward end of scoop 28 and down chute 34 (arrow M). At the same time, push bar 30 will be pivoted upwardly out of the way (arrow N).

Figure 11:
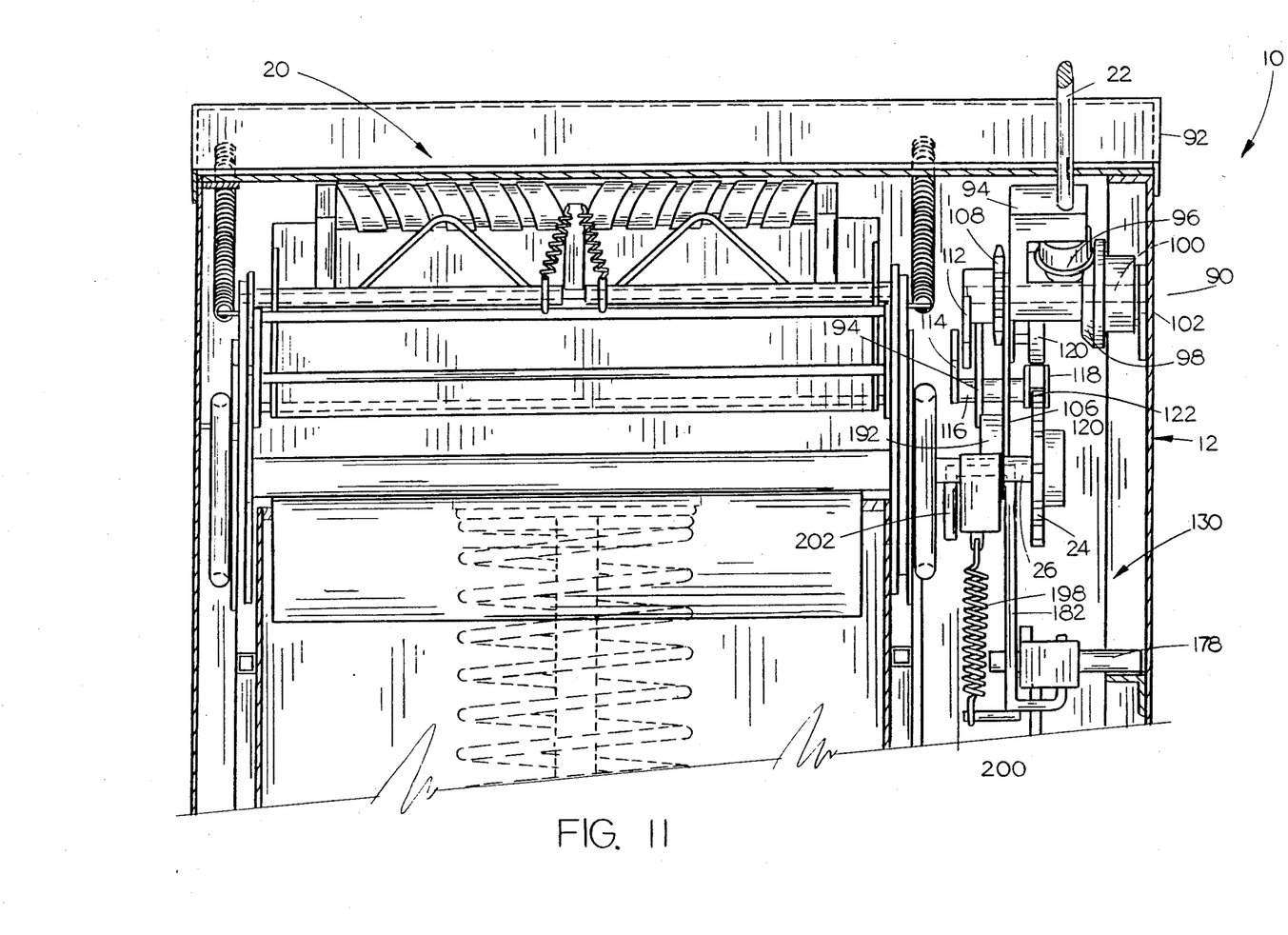
FIG. 11 is an enlarged front sectional view of the invention showing, in particular, the power assembly and a portion of the coin-operated lock assembly.
Figure 12:
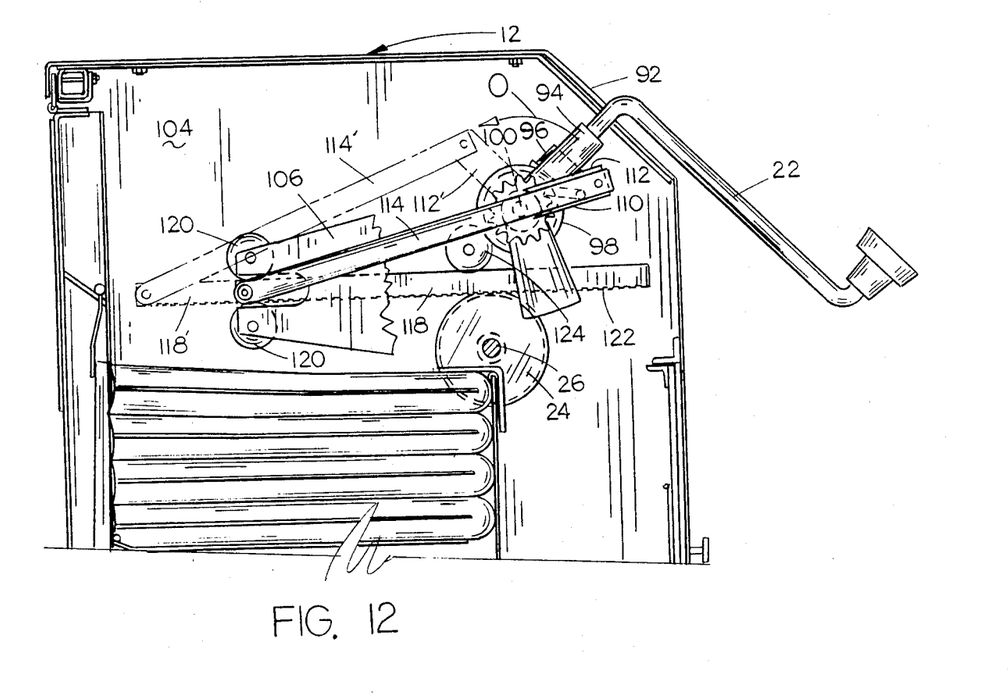
FIG. 12 is a side sectional view of the power assembly.

Referring now to FIGS. 11-12, the power assembly 90 serves to translate the rotational power from handle 22 into a reciprocating rotational movement at drive gear 24 and drive shaft 26. FIG. 12 is a sectional side view with the scoop assembly 20 and coin-operated lock assembly 130 removed, for clarity in describing power assembly 90. Handle 22 is rotatably mounted through a top cover 92 into a U-shaped bearing 94 where a bevel gear 96 is affixed thereto for rotation therewith between the legs of the U-shaped bearing 94. A second bevel gear 98 is rotatably mounted to mesh with the first bevel gear 96, and is approximately twice as large, to effect a gear reduction of approximately 2 to 1. In this way, two complete rotations of handle 22 are necessary to rotate second bevel gear 98 just once. This gear reduction is preferred so as to make operation of the newspaper vender 10 much less strenuous.

Second bevel gear 98 is mounted on a shaft 100 and will rotate the shaft to transmit the rotational energy of handle 22. Shaft 100 extends through second bevel gear 98 and is mounted at one end to a bearing 102 on the side wall 104 of frame 12, and projects through a vertical plate 106 at its other end which acts as a bearing. The projecting end of shaft 100 has a spur gear 108 mounted thereon, which corresponds with a pivotally mounted pawl (see FIG. 12) 110 mounted on plate 106 to act as a ratchet, allowing rotation in only a single direction. A drive arm 112 is mounted with spur gear 108 on shaft 100, and projects perpendicularly therefrom. Drive arm 112 has one end of an elongated plate 114 pivotally connected at its end, plate 114 extending parallel to vertical plate 106. Elongated plate 114 is pivotally connected at its other end to an arm 116 projecting from an elongated horizontally oriented rack member 118. A pair of rollers 120 in rolling contact with the upper and lower surfaces of rack member 118 are mounted to vertical plate 106 to maintain the horizontal alignment of rack 118. Rack 118 rests with its teeth 122 directed downwardly on drive gear 24 to rotate the gear. A freely rotatable roller 124 is mounted above rack 118 and drive gear 24 to maintain the mesh of teeth 122 with gear 24.

Thus, rotation of handle 22 will cause arm 112 on shaft 100 to rotate about the axis of shaft 100. The connection of elongated plate 114 to arm 112 will cause rack 118 to reciprocate horizontally. This in turn will cause drive gear 24 and drive shaft 26 o rotate first in one direction and then reverse and rotate back in the opposite direction. This reciprocating motion operates the scoop assembly 20 as described above. Arrow 0 in FIG. 12 indicates the direction in which arm 112 will rotate so as to reciprocate elongated plate 114. A broken-line drawing of arm 112' and plate 114' shows a position slightly prior to the full extent of rearward motion of rack 118'.

Figure 14:
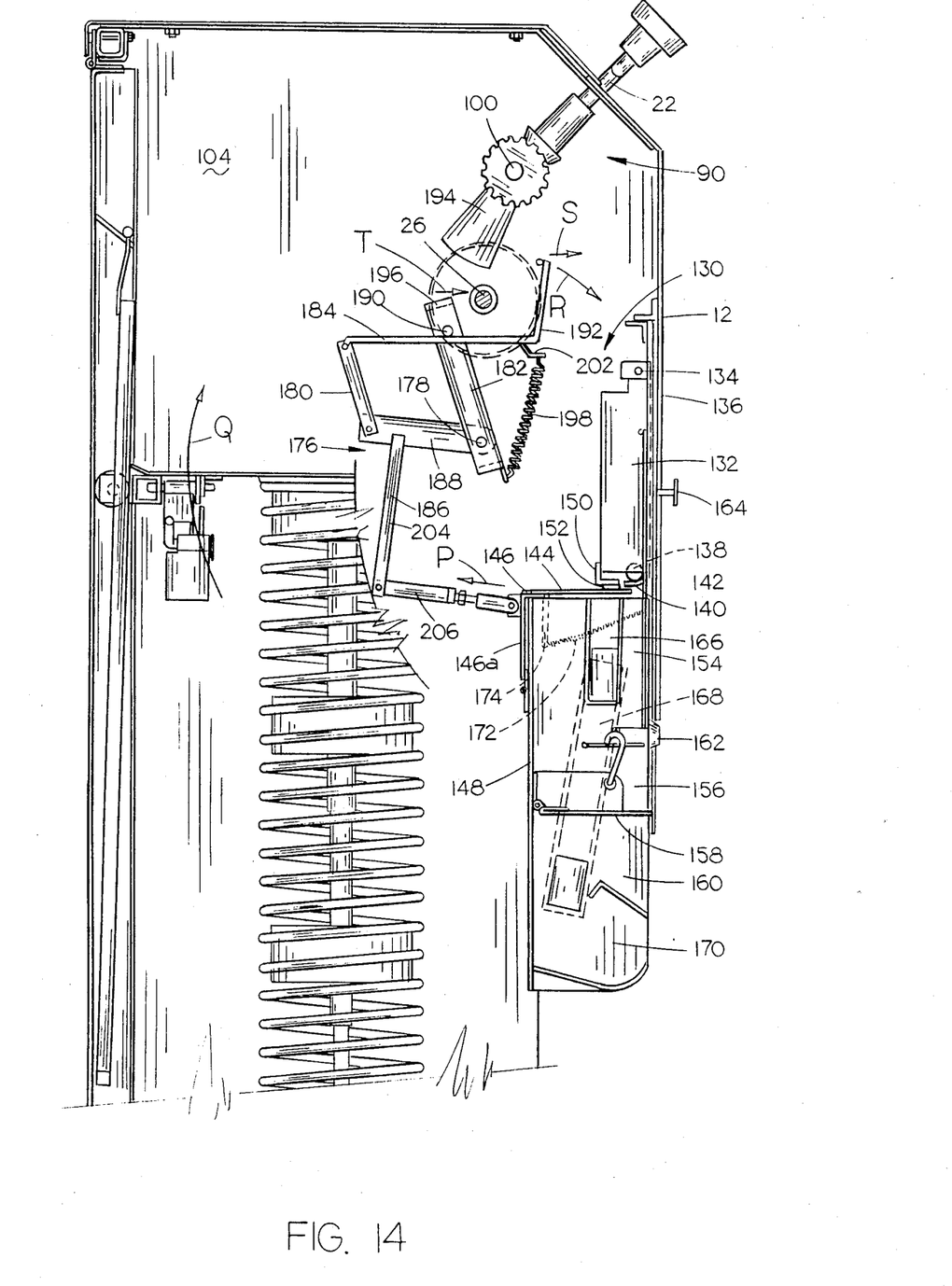
FIG. 14 is a side sectional view with portions removed for clarity, showing the coin-operated lock assembly.

The coin-operated lock assembly 130 is shown in FIG. 14 and a portion thereof in FIG. 11, and serves to restrain handle 22 from rotating until the proper coins have been inserted in the machine 10. As with previous drawings, the other assemblies are not shown, such that the parts and operation of the coin-operated lock assembly 130 may be more clearly described. Lock assembly 130 includes a coin mechanism 132, conventional in the art, and pivotally connected at its upper end 134 to the front wall 136 of frame 12. A coin 138 will drop through mechanism 132, and if the appropriate amount is present, will be prevented from moving back upward in the mechanism. Coin 138 will ret on a horizontally oriented plate 140 having an upwardly bent end 142. Plate 140 is affixed on top of a second plate 144 so as to form an upper layer with a vertical ledge. Plates 140 and 144 are attached to a hinge 146 having one leg pivotally mounted to a coin storage box 148, such that plate is horizontally slidable away from front wall 136 of frame 12.

A rigid frame 150 is affixed above plate 144 and has a depending wall 152 in slidable contact with plate 144. Wall 152 is positioned to slidably abut plate 140. When a coin 138 is present, plates 140 and 144 will pivot at hinge 146 such that plate 140 will slide past wall 152, thereby allowing the dispenser 10 to operate, as will be discussed in more detail hereinbelow. Because coin 138 will not move upwardly, bent end 142 is caused to move downward under coin 138 thereby pivoting plate 140. Without a coin, plate 140 will not pivot and will not be able to slide past wall 152.

Once plate 140 slides under wall 152, coin 138 will drop through a chute 154 into a storage compartment 156. The bottom plate 158 of storage compartment 156 is pivotally mounted such that the forward edge may be dropped so as to release the stored coins out a spout 160 in the front wall 136. Bottom plate 158 is manually pivoted by the turning of a key in lock 162 mounted on front wall 136. Thus, the collection of money from the machine does not require opening the machine 10.

A coin return button 164 mounted in front wall 136 will pivot coin mechanism 132 about its upper end 134, such that coin 138 will drop through a separate coin return chute 166 located adjacent and behind chute 154. Coin return chute 166 is sloped such that coin 138 drops through a separate channel 168 on the outside of coin storage box 148, and then returns inside coin storage box 148 near the bottom in the coin return spout 170. This zigzag course through a separate channel 168 eliminates the possibility of forcing a crowbar or the like into the coin mechanism 132 from spout 170.

As discussed above, hinge 146 has one leg 146a pivotally connected to the rearward wall of coin storage box 148, the other leg 146b being plate 144. A spring 172 affixed between a depending arm 174 attached to plate 144 and front wall 136, serves to return plates 144 and 140 to their original position once a coin has passed thereby.

A handle locking assembly 176 is pivotally mounted on an axle 178 which projects from side wall 104. Assembly 176 includes a parallelogram of pivotally connected elongated straps, including a first 180 and second 182 side member, an upper L-shaped member 184 and a lower T-shaped member 186. First side member 180 is connected between one end of upper L-shaped member 184 and one end of the horizontal crossbar 188 of T-member 186. Second side member 182 is connected at one end to an intermediate pivot point 190 on L-shaped member 184, and at the other end to axle 178—axle 178 also forming the pivotal point for the other end of horizontal crossbar 188 of T-member 186. Thus, axle 178 forms the main pivot point for the entire assembly 176.

Upper L-shaped member 184 has its short leg 192 of the "L" projecting upwardly within the rotating path of a plate 194 fastened to the rotating shaft 100 of power assembly 90. Second side member 182 has an upper projecting end 196 which extends a distance such that main drive shaft 26 will lie within its pivotal path about its pivotal connection with axle 178. A spring 198 is affixed between a lower projecting end 200 of second side member 182, and a depending arm 202 near the leg end of L-member 184. Spring 198 serves to bias upper end 196 of second side member 182 away from drive shaft 26.

The lower leg 204 of T-member 186 is pivotally connected at its lower end to one end of an adjustment arm 206, which is pivotally connected at its other end to hinge 146. Adjustment arm 206 may be selectively lengthened or shortened as necessary to change the distance between the bottom of leg 204 and hinge 146.

In operation, coin 138 will allow plate 140 to slide away from front wall 136, thereby allowing hinge 146 to pivot as shown by arrow P. This in turn will allow the entire lock assembly 176 to pivot around axle 178 (arrow Q) such that the upper end of leg 192 of L-member 194 will move in a downward arc, as shown as arrow R. Thus, when handle 22 is rotated, and a coin 138 is present, plate 194 will push against L-member leg 192 until the end of leg 192 slides below plate 194. Plate 194 can then slide past leg 192 and the newspaper dispenser 10 will operate to dispense a paper.

However, if no coin is inserted, or an improper amount is inserted, the coins will be allowed to slide upwardly in coin mechanism 132 and therefore will not pivot plate 140 to release it from depending wall 152, thereby holding T-member 186 from pivoting about axle 178. Since T-member 186 is thereby restrained from movement, plate 194 will push against L-member leg 192 and cause side members 180 and 182 to pivot about their connections to crossbar 188 on T-member 186. This pivotal movement will cause L-member 184 to move horizontally, as shown by arrow S, rather than through the arc of arrow R, until upper end 196 of side member 182 contacts drive shaft 26 (arrow T) and prevents all movement of L-member 184. Since the upper end of L-member leg 192 moves only a limited distance horizontally, it will not allow plate 194 to slide therepast, and will thereby restrain handle 22 from operating. Thus, lock assembly 176 will allow handle 22 to operate when the proper coins are inserted and the entire assembly 176 pivots in an arc around axle 178, but will not allow handle 22 to operate when only side members 180 and 182 pivot to allow only horizontal movement of L-member 184.

Figure 13:
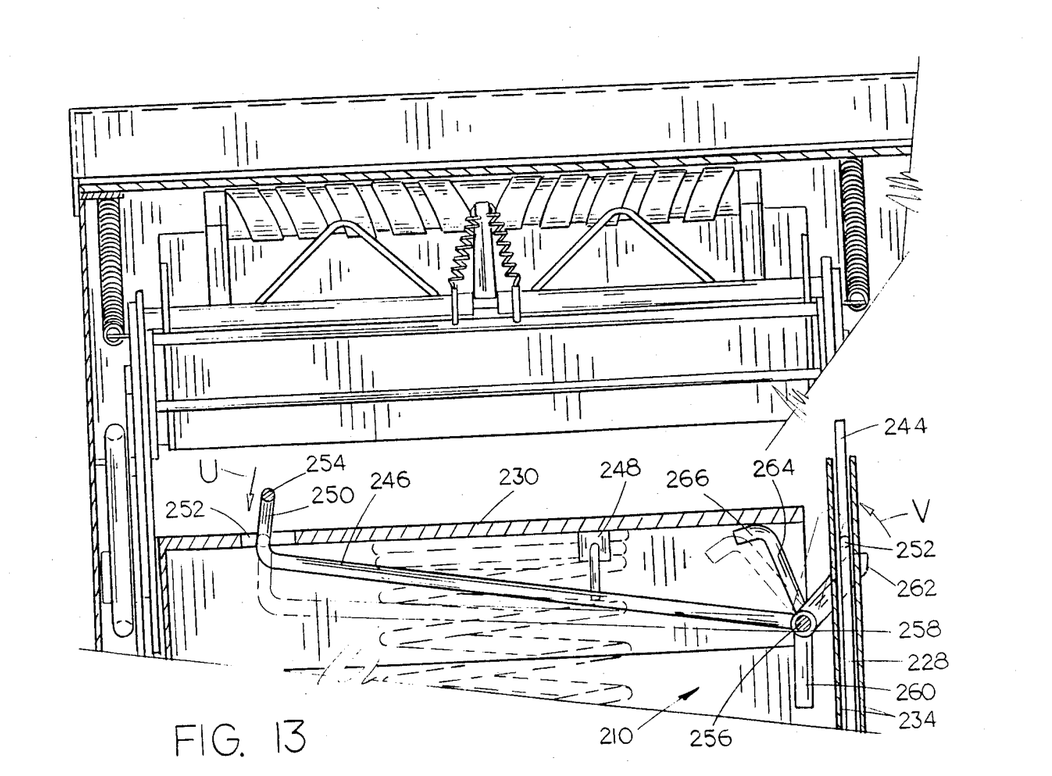
FIG. 13 is an enlarged front sectional view of a portion of the invention showing a portion of the display-paper release assembly.
Figure 15:
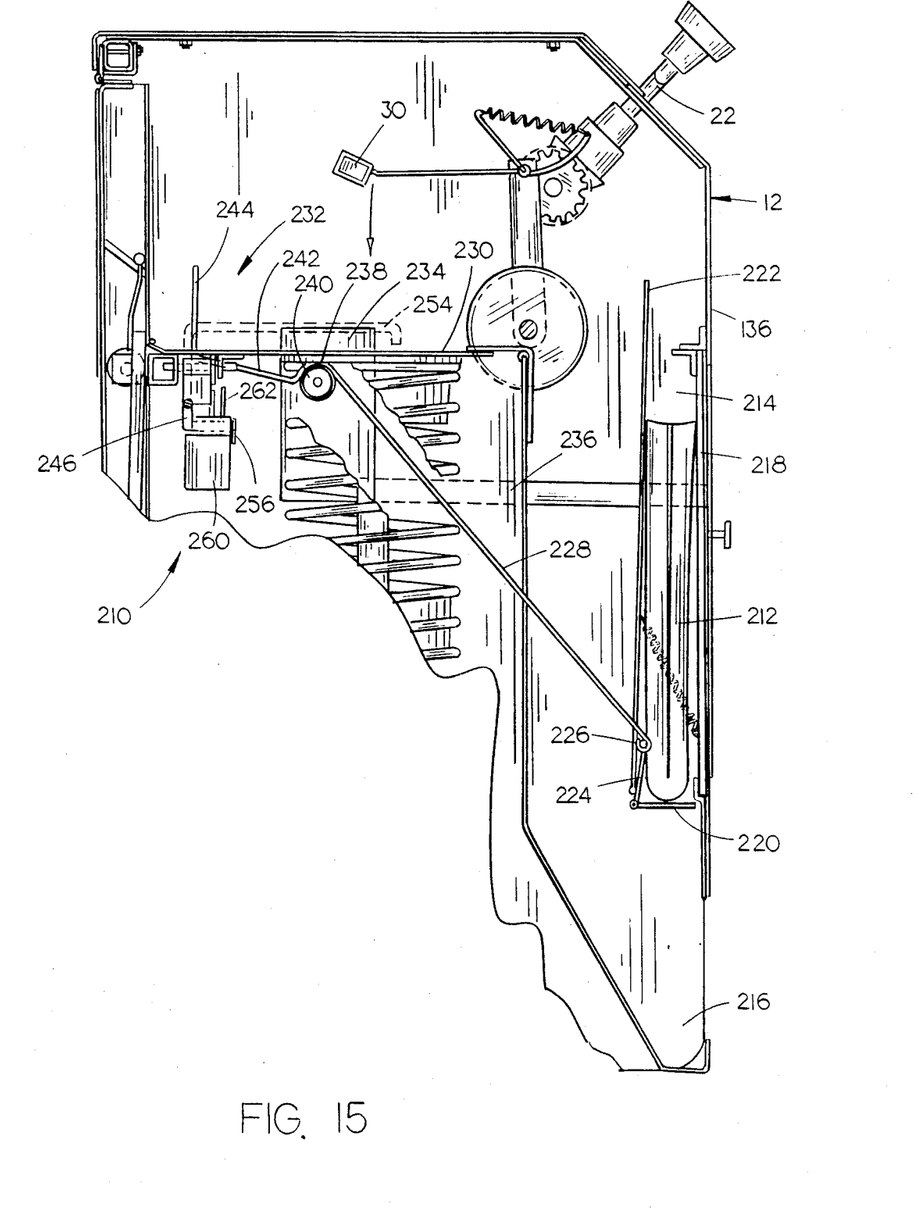
FIG. 15 is a side sectional view of the invention with portions removed for clarity, showing the display-paper release assembly.

Referring now to FIGS. 13 and 15, display paper release assembly 210 serves to drop the exposed display paper 212 from its pocket 214 to the newspaper spout 216. Pocket 214 is formed behind a transparent wall 218 of plastic material or the like, the transparent wall 218 being mounted in front wall 136. A pivotal bottom plate 220 supports paper 212 between a spring-biased back wall 222 and transparent front wall 218. Back wall 222 is spring-biased to pivot forwardly and press paper 212 against transparent wall 218 to enable the display paper 212 to be easily read.

Bottom plate 220 is pivoted between a horizontal paper-supporting position to a vertical paper-dropping position by a drive arm 224 affixed to one end thereof. Drive arm 224 is pivotally connected to the lower end 226 of an elongated trip-rod 228, which extends upwardly and rearwardly to a position adjacent a side edge of paper stack support platform 230. A trip-rod activating mechanism 232 is attached to platform 230, and will activate trip-rod 228 to drop display paper 212.

Trip-rod 228 extends between a pair of vertically-oriented plates 23 which will allow movement of trip-rod 228 through only a vertical plane. Vertical plates 234 are mounted spaced apart to a beam 236 extending from frame 12. A small arcuate portion 238 of trip-rod 228 rests atop a roller 240 rotatably mounted between plates 234. Arcuate portion 238 will rest on roller 240 to resist the weight of display paper 212 on bottom plate 220, maintaining the bottom plate 220 in its horizontal position supporting display paper 212.

Trip-rod 228 has a generally horizontal portion 242 which extends generally parallel to the side edge of platform 230, the horizontal portion 242 being oriented to be pushed upwardly by a portion of mechanism 232 to release arcuate portion 238 from roller 240 and allow the weight of paper 212 to pivot bottom plate 220 downwardly to drop display paper 212. An upwardly projecting leg 244 at the upper end of trip-rod 228 allows for the manual release and resetting of trip-rod 228.

The trip-rod activating mechanism 232 is best viewed in FIG. 13, wherein an elongated arm 246 is pivotally mounted to the bottom of platform 230, on a fulcrum 248. One end 250 of arm 246 is bent vertical and extends upwardly through a slot 252 in platform 230. A horizontal arm 254 affixed to the top of the vertically bent end 250 of arm 246 (and shown in broken lines in FIG. 15) projects above and parallel to platform 230 when no papers 14 are stacked thereon. Slot 252 is of a length long enough to allow arm 254 to pass therethrough when papers 14 lie on top of platform 230. The other end 256 of arm 246 is bent perpendicularly and horizontally so as to be parallel to the vertical plane in which trip-rod 228 moves.

A sleeve 258 is rotatably mounted to horizontal end 256 and has a weight 260, a lever 262, and a dog 264 affixed thereto for rotatable movement therewith. Weight 260 causes the opposite end 250 of arm 246 to project upwardly through slot 252 when the last paper on top of platform 230 is removed. Weight 260 also maintains lever 262 in a generally upwardly sloping position, and dog 264 at a slightly off-vertical position, such that they will rotate properly when utilized to trip trip-rod 228.

Lever 262 will project outwardly slightly beyond the plane through which trip-rod 228 moves when in its position ready to trip the trip-rod 228. Dog 264 has a bent end 266 which will urge the dog 264 to rotate when end 256 of arm 246 is raised towards platform 230.

In operation, removal of the last paper from platform 230 will cause end 250 and horizontal arm 254 to project upwardly through slot 254 in platform 230, due to the bias of weight 260 at the opposite end of arm 246. This will cause lever 262 to drop to a generally upwardly sloping position and dog 264 to move upward to a slightly off-vertical position. As handle 22 is operated, push bar 30 will drop down onto arm 254, forcing it downwardly into slot 252 (arrow U, FIG. 13). This in turn will force end 256 of arm 246 upwardly causing dog 264 to pivot upon contact with the bottom of platform 230. Finally, lever 262 will move upwardly (arrow V) and pivot so as to contact horizontal portion 252 of trip-rod 228 and push it upwardly such that arcuate portion 238 is pushed over roller 240 thereby releasing display paper 212.

Referring now to FIGS. 2 and 5, newspaper dispenser 10 is easily loaded by unlocking and raising top portion 12a of frame 12 to reveal platform 230. A stack of papers 14 are piled on platform 230 with their folded edges 14a forward, and is pushed downwardly against the bias of main spring 268 coiled around telescoping post 270. The stack of papers 14 is biased upwardly by main spring 268 and held in position at their upper folded edge by pivotal plate 86. FIG. 16 is a side sectional view of the invention which shows the interrelation of all of the assemblies described above.

It can therefore be seen that the above described invention fulfills at least all of the above objectives.

I claim:

1. A newspaper dispenser for dispensing a single newspaper at at time, comprising:
   an enclosed frame having a platform therein adapted to support a vertical stack of newspapers laid flat thereon, said newspaper having a folded edge and said platform having forward and rearward edges,
   said newspaper being stacked with their folded edge aligned above the forward edge of said platform,
   a stop means connected to said frame above said platform and located over the forward edge of said platform to hold the folded edge of said papers,
   biasing means for biasing said stack of newspapers upwardly against said stop means;
   pusher means for pushing the top paper toward the rearwardly edge of said platform;
   an operable means for lifting the top newspaper upwardly off of said stack after release from said stop means;
   a rotatable handle for operating said operable lifting means, and causing said lift means to slide under the top newspaper in the stack,
   a newspaper dispensing chute mounted between said lift means and an opening in the front wall of said frame, for dispensing a paper from said lift means to the front wall opening; and
   said operable lifting means being pivotal to cause said lifted newspaper to slide off said lifting means and drop down said chute.

2. The newspaper dispenser of claim 1, wherein said housing includes a base portion and a top portion, the top portion being pivotally connected to the base portion, whereby the top portion may be pivoted upwardly to allow access to the interior of the base portion.

3. The newspaper dispenser of claim 2, wherein said platform, newspaper stack and stop means are mounted in said lower portion, and wherein said lift means and handle means are mounted in said top portion to pivot upwardly therewith.

4. The newspaper dispenser of claim 1, further comprising a pocket means attached to the front wall of said frame for holding a display paper therein, a portion of said frame front wall being transparent and forming the front wall of said pocket means.

5. The newspaper dispenser of claim 4, wherein said pocket means includes an operable bottom wall selectively pivotable between a generally horizontal position for supporting a display newspaper, and generally vertical position which allows the display newspaper to drop into a newspaper dispensing spout.

6. The newspaper dispenser of claim 5, further comprising means connected to said platform for pivoting said bottom wall upon operation of said handle while said platform has no newspapers thereon.

7. The newspaper dispenser of claim 1, further comprising coin-operated lock means, said lock means operable to restrain rotation of said handle until the proper coins have been inserted therein.

8. A newspaper dispenser for dispensing a single newspaper at a time, comprising:
   an enclosed frame having a platform therein adapted to support a vertical stack of newspapers laid flat thereon, said newspapers having a folded edge and said platform having forward and rearward edges,
   said newspaper being stacked with their folded edge aligned above the forward edge of said platform,
   a stop means connected to said frame above said platform and located over the forward edge of said platform to hold the folded edge of said papers, biasing means for biasing said stack of newspapers upwardly against said stop means;

pusher means for pushing the top paper toward the rearward edge of said platform;

an operable means for lifting the top newspaper upwardly off of said stack after release from said stop means;

a rotatable handle for operating said operable lifting means, and causing said lift means to slide under the top newspaper in the stack;

a newspaper dispensing chute mounted between said lift means and an opening in the front wall of said frame, for dispensing a paper from said lift means to the front wall opening;

said operable lifting means being pivotal to cause said lifted newspaper to slide off said lifting means and drop down said chute;

said lift means including a generally flat scoop means having a forward edge and a rearward edge;

said lift means being connected to a reciprocating rotatable shaft, said shaft being adapted to pull scoop means into scooping position adjacent the folded edge of the top newspaper in the stack when rotated in one direction, adapted to push said scoop means under the folded edge and under the top newspaper released by said pusher means from the stop means when reciprocated to rotate in the opposite direction, and adapted to tilt one edge of said scoop means upwardly such that the newspaper slides off the scoop means into said chute; and said shaft being operably connected to said handle.

9. The newspaper dispenser of claim 8, wherein said pusher means is connected to said reciprocating shaft to pivot from a raised position to a lowered operable position in frictional contact with the top newspaper in the stack, said reciprocating shaft connected so as to push said pusher arm towards the rearward edge of said platform when rotating in one direction, to pull said pusher arm back towards the forward edge of said platform when rotating in the opposite direction, and to raise said pusher arm upwardly to its raised position at the end of a reciprocating cycle.

10. The newspaper dispenser of claim 9, wherein said pusher means comprises an elongated arm oriented horizontally and from side to side over said platform and newspapers, having a rubber material wrapped therearound for frictional contact with said newspapers.

11. The newspaper dispenser of claim 10, wherein said pusher arm and scoop means are operably connected to said reciprocating shaft such that rotation of said shaft in one direction causes said pusher arm to drop into operable contact with said top newspaper and causes said pusher arm to push on said newspaper toward the rearward edge of said platform, and simultaneously causes said scoop to drop onto said top newspaper and move to a scooping position adjacent the folded edge of said newspaper, and wherein reverse rotation of said shaft causes said pusher arm to move towards the forward edge of said newspaper while simultaneously pushing said scoop under the folded edge of said newspaper and towards the rearward edge of said platform, whereby the folded edge of the top newspaper is pulled from under the stop means and raised slightly by said pusher arm, and pulled up onto the scoop by movement of the scoop under the paper in conjunction with opposite movement of the pusher arm.

12. The newspaper dispenser of claim 8, further comprising gear means mounted in said housing connecting said handle on said reciprocating shaft, whereby rotation of said handle in one direction is translated by said gear means into reciprocating rotational movement of said shaft.

* * * * *